US011372215B2

(12) United States Patent
Nitta et al.

(10) Patent No.: US 11,372,215 B2
(45) Date of Patent: Jun. 28, 2022

(54) CAMERA LENS INCLUDING SEVEN LENSES OF +−++−+− REFRACTIVE POWERS

(71) Applicant: AAC Optics Solutions Pte. Ltd., Singapore (SG)

(72) Inventors: Koji Nitta, Osaka (JP); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 334 days.

(21) Appl. No.: 16/835,286

(22) Filed: Mar. 30, 2020

(65) Prior Publication Data

US 2021/0223513 A1    Jul. 22, 2021

(30) Foreign Application Priority Data

Jan. 20, 2020  (JP) .............................. JP2020-006772

(51) Int. Cl.
  *G02B 13/00*    (2006.01)
  *G02B 9/64*    (2006.01)

(52) U.S. Cl.
  CPC ........... *G02B 13/0045* (2013.01); *G02B 9/64* (2013.01)

(58) Field of Classification Search
  CPC .............................. G02B 13/0045; G02B 9/64
  See application file for complete search history.

(56) References Cited

U.S. PATENT DOCUMENTS

2017/0082834 A1*    3/2017    Tang ................... G02B 13/0045

\* cited by examiner

*Primary Examiner* — Wen Huang
(74) *Attorney, Agent, or Firm* — W&G Law Group (57) ABSTRACT

The present disclosure relates to the technical field of optical lens and discloses a camera lens. The camera optical lens includes, from an object side to an image side: a first lens having a positive refractive power, a second lens having a negative refractive power, a third lens having a positive refractive power, a fourth lens having a positive refractive power, a fifth lens having a negative refractive power, a sixth lens having a positive refractive power, and a seventh lens having a negative refractive power. The camera lens satisfies prescribed conditions. The camera lens has advantages of being ultra-thin and wide-angle, and has good optical properties.

3 Claims, 6 Drawing Sheets

CAMERA LENS INCLUDING SEVEN LENSES OF +−++−+− REFRACTIVE POWERS

TECHNICAL FIELD

The present disclosure relates to a camera lens, and in particular to, a camera lens suitable for mobile phone camera module and WEB camera lens equipped with high-pixel camera elements such as CCD, CMOS etc., and the camera lens including seven lenses, TTL (total optical length)/IH (image height)<1.30, is ultra-thin, field of view (hereinafter referred to as 2ω) is above 80° and has excellent optical properties.

BACKGROUND

In recent years, various camera devices equipped with camera elements such as CCD, CMOS are extensively popular. With development on camera lens toward miniaturization and high performance, there is an urgent need for an ultra-thin, wide-angle camera lenses with excellent optical properties.

Therefore, the technology development of an ultra-thin, wide-angle camera lenses having seven lenses and good optical properties is currently being promoted. Reference document 1 discloses a camera lens including seven lenses, from an object side to an image side, the camera lens including a first lens having a positive refractive power, a second lens having a negative refractive power, a third lens having a positive refractive power, a third lens having a positive refractive power, a fifth lens having a negative refractive power, a sixth lens having a positive refractive power, and a seven lens having a negative refractive power.

Examples 1, 2, 6, 7, 8, 9, and 10 of the reference document Japanese unexamined patent application publication No. 2014-102408 discloses a camera lens, and further discloses difference between the abbe numbers of the first lens and the second lens, difference between the abbe numbers of the first lens and the third lens, and a ration of the focal length of the first lens to that of the second lens. However refractive power distribution of the fifth lens is insufficient, so it is not sufficiently for ultra-thin and wide-angle.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Referring to the accompanying drawings, the present disclosure provides a camera lens LA including a lens system with seven lenses structures. Specifically, the camera lens includes, from an object side to an image side: a first lens L1, a second lens L2, a third lens L3, a fourth lens L4, a fifth lens L5, a sixth lens L6 and a seventh lens L7. An optical filter GF may be disposed between the seventh lens L7 and an image surface Si. The optical filter GF may be a glass cover or various filters. In the present disclosure, the optical filter GF may be disposed at a different position, or its structure may be omitted.

The first lens L1 has a positive refractive power, the second lens has a negative refractive power, the third lens has a positive refractive power, the fourth lens has a positive refractive power, the fifth lens has a negative refractive power, the sixth lens has a positive refractive power, and the seventh lens has a negative refractive power. Moreover, in order to correct various aberrations well, each surface of the seven lenses preferably has an aspheric shape.

Here, a focal length of the camera lens LA is defined as f, a focal length of the first lens L1 is defined as f1, a focal length of the second lens L2 is defined as f2, a focal length of the fifth lens L5 is defined as f5, an abbe number of the first lens L1 is defined as ν1, an abbe number of the second lens L2 is defined as ν2, an abbe number of the third lens L3 is defined as ν3, and the camera lens LA should satisfy following conditions (1) to (4):

$$50.00 \le \nu1-\nu2 \le 70.00 \quad (1);$$

$$50.00 \le \nu1-\nu3 \le 70.00 \quad (2);$$

$$-0.25 \le f1/f2 \le -0.10 \quad (3); \text{ and}$$

$$-100.00 \le f5/f \le -25.00 \quad (4).$$

The condition (1) specifies a difference between the abbe number ν1 of the first lens L1 and the abbe number ν2 of the second lens L2. If the difference is outside the range of the condition (1), with the development of wide-angle and ultra-thin, it may be difficult to correct chromatic aberrations on-axis and off-axis, so it is not preferable.

The condition (2) specifies a difference between the abbe number ν1 of the first lens L1 and the abbe number ν3 of the third lens L3. If the difference is outside the range of the condition (2), with the development of wide-angle and ultra-thin, it may be difficult to correct chromatic aberrations on-axis and off-axis, so it is not preferable.

The condition (3) specifies a ratio between the focal length f1 of the first lens L1 and the focal length f2 of the second lens L2. If the ratio is outside the range of the condition (3), with the development of wide-angle and ultra-thin, it may be difficult to correct chromatic aberrations on-axis and off-axis, so it is not preferable.

The condition (4) specifies the negative refractive power of the fifth lens L5. If outside the range of the condition (4), with the development of wide-angle and ultra-thin, it may be difficult to correct chromatic aberrations on-axis and off-axis, so it is not preferable.

A focal length of the third lens L3 is defined as f3, and the camera lens LA should satisfy following condition (5):

$$25.00 \leq f3/f \leq 48.00 \quad (5).$$

The condition (5) specifies the positive refractive power of the third lens L3. Within the range of the condition (5), the camera lens of the present disclosure exhibits wide-angle and ultra-thin with excellent optical properties.

A focal length of the fourth lens L4 is defined as f4, and the camera lens LA should satisfy following condition (6):

$$35.00 \leq f4/f \leq 300.00 \quad (6)$$

The condition (6) specifies the positive refractive power of the fourth lens L4. Within the range of the condition (6), the camera lens of the present disclosure exhibits wide-angle and ultra-thin with excellent optical properties.

Because the seven lenses of the camera lens LA all have the stated structures and satisfy the above conditions, so it is possible to produce a camera lens which is composed of seven lenses with excellent optical properties, TTL (total optical length)/IH (image height)<1.30, ultra-thin and wide-angle of 2ω>80°.

The camera lens LA of the present disclosure shall be described below by using the embodiments. Moreover, the symbols used in all embodiments are shown as follows. And mm shall be taken as the units of the focal length, on-axis distance, on-axis thickness, curvature radius, and image height.

LA: camera lens
L1: first lens
L2: second lens
L3: third lens
L4: fourth lens
L5: fifth lens
L6: sixth lens
L7: seventh lens
GF: optical filter
f: focal length of the camera lens
f1: focal length of the first lens
f2: focal length of the second lens
f3: focal length of the third lens
f4: focal length of the fourth lens
f5: focal length of the fifth lens
f6: focal length of the sixth lens
f7: focal length of the seventh lens
Fno: F number
2ω: field of view
STOP: aperture
R: curvature radius of an optical surface, a central curvature radius for a lens
R1: curvature radius of an object-side surface of the first lens L1
R2: curvature radius of an image-side surface of the first lens L1
R3: curvature radius of the object-side surface of the second lens L2
R4: curvature radius of the image-side surface of the second lens L2
R5: curvature radius of the object-side surface of the third lens L3
R6: curvature radius of the image-side surface of the third lens L3
R7: curvature radius of the object-side surface of the fourth lens L4
R8: curvature radius of the image-side surface of the fourth lens L4
R9: curvature radius of the object-side surface of the fifth lens L5
R10: curvature radius of the image-side surface of the fifth lens L5
R11: curvature radius of the object-side surface of the sixth lens L6
R12: curvature radius of the image-side surface of the sixth lens L6
R13: curvature radius of the object-side surface of the seventh lens L7
R14: curvature radius of the image-side surface of the seventh lens L7
R15: curvature radius of the object-side surface of the optical filter GF
R16: curvature radius of the image-side surface of the optical filter GF
d: on-axis thickness of a lens or on-axis distance between lenses
d0: on-axis distance from the aperture STOP to the object-side surface of the first lens L1
d1: on-axis thickness of the first lens L1
d2: on-axis distance from the image-side surface of the first lens L1 to the object-side surface of the second lens L2
d3: on-axis thickness of the second lens L2
d4: on-axis distance from the image-side surface of the second lens L2 to the object-side surface of the third lens L3
d5: on-axis thickness of the third lens L3
d6: on-axis distance from the image-side surface of the third lens L3 to the object-side surface of the fourth lens L4
d7: on-axis thickness of the fourth lens L4
d8: on-axis distance from the image-side surface of the fourth lens L4 to the object-side surface of the fifth lens L5
d9: on-axis thickness of the fifth lens L5
d10: on-axis distance from the image-side surface of the fifth lens L5 to the object-side surface of the sixth lens L6
d11: on-axis thickness of the sixth lens L6
d12: on-axis distance from the image-side surface of the sixth lens L6 to the object-side surface of the seventh lens L7
d13: on-axis thickness of the seventh lens L7
d14: on-axis distance from the image-side surface of the seventh lens L7 to the object-side surface of the optical filter GF
d15: on-axis thickness of the optical filter GF
d16: on-axis distance from the image-side surface to the image surface of the optical filter GF
nd: refractive index of d line
nd1: refractive index of the d line of the first lens L1
nd2: refractive index of the d line of the second lens L2
nd3: refractive index of the d line of the third lens L3
nd4: refractive index of the d line of the fourth lens L4
nd5: refractive index of the d line of the fifth lens L5
nd6: refractive index of the d line of the sixth lens L6
nd7: refractive index of the d line of the seventh lens L7 ndg: refractive index of the d line of the optical filter GF
vd: abbe number
v1: abbe number of the first lens L1
v2: abbe number of the second lens L2
v3: abbe number of the third lens L3
v4: abbe number of the fourth lens L4
v5: abbe number of the fifth lens L5
v6: abbe number of the sixth lens L6
v7: abbe number of the seventh lens L7
vg: abbe number of the optical filter GF
TTL: Optical length (i.e., the total optical length from the object-side surface of the first lens L1 to the image surface of the camera lens LA along the optical axis) in mm
LB: on-axis distance from the image-side surface to the image surface of the seventh lens L7 (including a thickness of the optical filter GF)
IH: image height Embodiment 1

Figure 1:
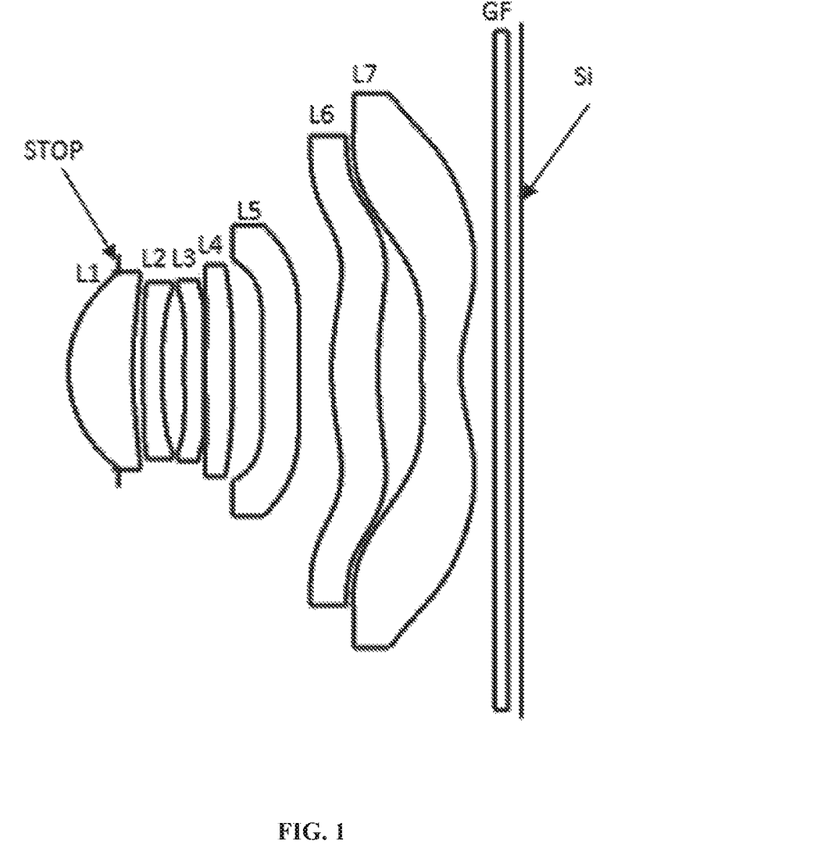
FIG. 1 is a schematic diagram of a structure of a camera lens according to Embodiment 1 of the present disclosure.

FIG. 1 shows a structural schematic diagram of a configuration of a camera lens LA according to Embodiment 1 of the present disclosure. Table 1 shows the design data of the first lens L1 to the seventh lens L7 of the camera lens LA according to Embodiment 1, including a curvature radius R, an on-axis thickness or on-axis distance d, a refractive index nd, an abbe number vd, and an effective radius. Here the refractive index nd, the abbe number vd, and the effective radius correspond to a wavelength of 588.0 nm.

TABLE 1

|  | R |  | d | nd |  | vd | Effective radius (mm) |
|---|---|---|---|---|---|---|---|
| STOP | ∞ | d0= | −0.794 |  |  |  |  |
| R1 | 2.12279 | d1= | 1.029 | nd1 | 1.4959 v1 | 81.66 | 1.670 |
| R2 | 7.81273 | d2= | 0.160 |  |  |  | 1.557 |
| R3 | 23.77997 | d3= | 0.300 | nd2 | 1.6100 v2 | 31.60 | 1.499 |
| R4 | 8.62236 | d4= | 0.354 |  |  |  | 1.345 |
| R5 | 64.27345 | d5= | 0.310 | nd3 | 1.6100 v3 | 31.60 | 1.379 |
| R6 | 193.67712 | d6= | 0.030 |  |  |  | 1.518 |
| R7 | −79.56476 | d7= | 0.432 | nd4 | 1.5444 v4 | 55.82 | 1.610 |
| R8 | −47.92671 | d8= | 0.475 |  |  |  | 1.777 |
| R9 | 52.52752 | d9= | 0.577 | nd5 | 1.6700 v5 | 19.39 | 1.870 |
| R10 | 46.48459 | d10= | 0.526 |  |  |  | 2.447 |
| R11 | 5.50766 | d11= | 0.741 | nd6 | 1.5444 v6 | 55.82 | 3.575 |
| R12 | 10.37046 | d12= | 0.688 |  |  |  | 3.961 |
| R13 | 11.23938 | d13= | 0.620 | nd7 | 1.5346 v7 | 55.70 | 4.227 |
| R14 | 2.54670 | d14= | 0.550 |  |  |  | 4.664 |
| R15 | ∞ | d15= | 0.210 | ndg | 1.5168 vg | 64.20 | 5.657 |
| R16 | ∞ | d16= | 0.198 |  |  |  | 5.731 |

Reference wavelength = 588 nm

Table 2 shows conic coefficients and aspheric surface coefficients of the lenses of the camera lens LA according to Embodiment 1 of the present disclosure.

TABLE 2

|  | Conic coefficients | Aspheric surface coefficients | | | |
|---|---|---|---|---|---|
|  | k | A4 | A6 | A8 | A10 |
| R1 | 6.4476E−02 | −1.3436E−02 | 4.8393E−02 | −9.7012E−02 | 1.1868E−01 |
| R2 | 0.0000E+00 | −1.4531E−02 | 2.6277E−02 | −6.4321E−02 | 9.3593E−02 |
| R3 | 0.0000E+00 | −8.0826E−03 | −1.9198E−02 | 5.6000E−02 | −7.3555E−02 |
| R4 | 8.4380E+00 | 1.1020E−02 | −5.6537E−02 | 1.7555E−01 | −2.9901E−01 |
| R5 | 0.0000E+00 | 2.7446E−02 | −1.7904E−01 | 3.9926E−01 | −6.1733E−01 |
| R6 | 0.0000E+00 | 1.7063E−01 | −5.5526E−01 | 1.0387E+00 | −1.2829E+00 |
| R7 | 0.0000E+00 | 1.7334E−01 | −5.4023E−01 | 9.9814E−01 | −1.1738E+00 |
| R8 | 0.0000E+00 | −8.8481E−03 | −2.4413E−02 | 4.0493E−02 | −3.7674E−02 |
| R9 | 0.0000E+00 | −4.7950E−03 | −3.3213E−02 | 4.1377E−02 | −4.3005E−02 |
| R10 | 0.0000E+00 | 3.3822E−03 | −2.8937E−02 | 2.4008E−02 | −1.3112E−02 |
| R11 | 0.0000E+00 | 9.8263E−03 | −2.1323E−02 | 9.0035E−03 | −2.4229E−03 |
| R12 | 0.0000E+00 | 2.3959E−02 | −2.0132E−02 | 6.4113E−03 | −1.3320E−03 |
| R13 | 0.0000E+00 | −5.6624E−02 | 8.8664E−03 | −1.0915E−03 | 1.5503E−04 |
| R14 | −1.0000E+00 | −7.0830E−02 | 1.7236E−02 | −3.5728E−03 | 5.3039E−04 |

|  | Aspheric surface coefficients | | | | |
|---|---|---|---|---|---|
|  | A12 | A14 | A16 | A18 | A20 |
| R1 | −9.1717E−02 | 4.5031E−02 | −1.3615E−02 | 2.3130E−03 | −1.6945E−04 |
| R2 | −8.4017E−02 | 4.7381E−02 | −1.6371E−02 | 3.1694E−03 | −2.6366E−04 |
| R3 | 6.0581E−02 | −3.1024E−02 | 9.4470E−03 | −1.5216E−03 | 9.5683E−05 |
| R4 | 3.2425E−01 | −2.2302E−01 | 9.4561E−02 | −2.2630E−02 | 2.3718E−03 |
| R5 | 6.2559E−01 | −4.1407E−01 | 1.7226E−01 | −4.0739E−02 | 4.1813E−03 |
| R6 | 1.0103E+00 | −5.0905E−01 | 1.6135E−01 | −2.9630E−02 | 2.4254E−03 |
| R7 | 8.6495E−01 | −3.9838E−01 | 1.1212E−01 | −1.7752E−02 | 1.2192E−03 |
| R8 | 2.4477E−02 | −1.0813E−02 | 3.0214E−03 | −4.7658E−04 | 3.2078E−05 |

TABLE 2-continued

| R9  | 3.0964E−02  | −1.4773E−02 | 4.3916E−03  | −7.3337E−04 | 5.2135E−05  |
| R10 | 4.6670E−03  | −1.0668E−03 | 1.5061E−04  | −1.1933E−05 | 4.0599E−07  |
| R11 | 4.0809E−04  | −4.1726E−05 | 2.5143E−06  | −8.2223E−08 | 1.1269E−09  |
| R12 | 1.7630E−04  | −1.4352E−05 | 6.9481E−07  | −1.8396E−08 | 2.0573E−10  |
| R13 | −1.8325E−05 | 1.4388E−06  | −6.9644E−08 | 1.8900E−09  | −2.2034E−11 |
| R14 | −5.1955E−05 | 3.2507E−06  | −1.2511E−07 | 2.7052E−09  | −2.5200E−11 |

Here k is a conic coefficient, A4, A6, A8, A10, A12, A14, A16, A18, and A20 are aspheric surface coefficients.

$$y = (x^2/R)/[1+\{1-(k+1)(x^2/R^2)\}^{1/2}]A4x^4 + A6x^6 + A8x^8 + A10x^{10} + A12x^{12} + A14x^{14} + A16x^{16} + A18x^{18} + A20x^{20} \quad (7)$$

For convenience, an aspheric surface of each lenses surface uses the aspheric surfaces shown in the above formula (7). However, the present disclosure is not limited to the aspherical polynomials form shown in the formula (7).

Table 3 shows data of 2ω, Fno, f, f1, f2, f3, f4, f5, f6, f7, TTL, LB, and IH of the camera lens LA according to Embodiment 1 of the present disclosure.

TABLE 3

| 2ω (°)   | 83.02    |
|----------|----------|
| Fno      | 1.88     |
| f (mm)   | 6.278    |
| f1 (mm)  | 5.545    |
| f2 (mm)  | −22.345  |
| f3 (mm)  | 157.568  |
| f4 (mm)  | 220.345  |
| f5 (mm)  | −627.136 |
| f6 (mm)  | 20.476   |
| f7 (mm)  | −6.317   |
| TTL (mm) | 7.202    |
| LB (mm)  | 0.958    |
| IH (mm)  | 5.644    |

Table 16 in the following shows various values of Embodiments 1 to 5 and the values corresponding to parameters which are specified in the conditions (1) to (6).

As shown in Table 16, the camera lens according to Embodiment 1 satisfies the conditions (1) to (6).

Figure 2:
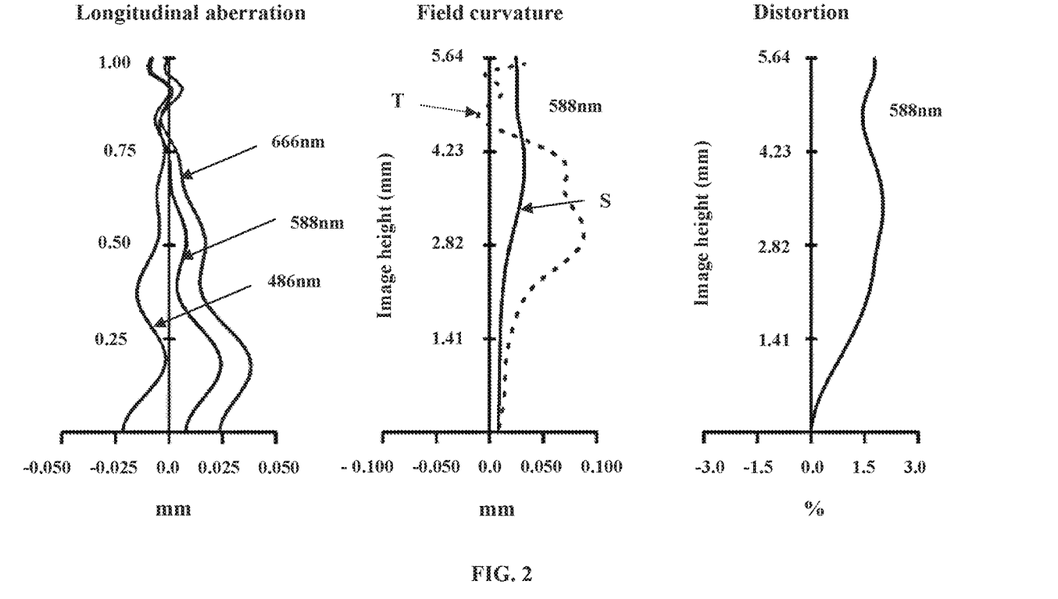
FIG. 2 is a schematic diagram of a longitudinal aberration, a field curvature, and a distortion of the camera lens according to Embodiment 1 of the present disclosure.

FIG. 2 shows a schematic diagram of a longitudinal aberration with wavelengths of 486.0 nm, 588.0 nm, and 666.0 nm after passing the camera lens LA according to Embodiment 1, respectively. FIG. 2 also shows a schematic diagram of a field curvature and a distortion with a wavelength of 588.0 nm after passing the camera lens LA according to Embodiment 1. Further, the field curvature S in FIG. 2 is a field curvature in a sagittal direction, and T is a field curvature in a tangential direction. The same applies to the following Embodiments 2 to 5.

The camera lens LA according to Embodiment 1 exhibits advantages of being wide-angle and ultra-thin with 2ω=83.02° and TTL/IH=1.276. As shown in FIG. 2, the chromatic aberrations on-axis and off-axis are fully corrected, thus the camera lens LA has excellent optical properties.

Embodiment 2

Figure 3:
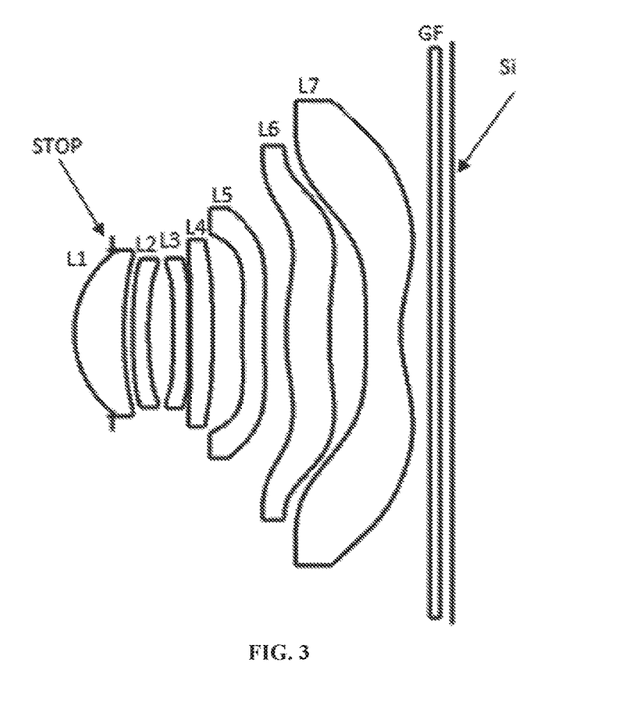
FIG. 3 is a schematic diagram of a structure of the camera lens according to Embodiment 2 of the present disclosure.

FIG. 3 shows a structural schematic diagram of a configuration of a camera lens LA according to Embodiment 2 of the present disclosure. Table 4 shows the design data of the first lens L1 to the seventh lens L7 of the camera lens LA according to Embodiment 2, including a curvature radius R, an on-axis thickness or on-axis distance d, a refractive index nd, an abbe number vd, and an effective radius. Here the refractive index nd, the abbe number vd, and the effective radius correspond to a wavelength of 588.0 nm.

TABLE 4

|      | R          | d         |       | nd     |     | vd    | Effective radius (mm) |
|------|------------|-----------|-------|--------|-----|-------|-----------------------|
| STOP | ∞          | d0=       | −0.730 |        |     |       |                       |
| R1   | 2.15948    | d1=       | 0.937 | nd1    | v1  | 81.66 | 1.670                 |
| R2   | 7.28118    | d2=       | 0.174 |        |     |       | 1.556                 |
| R3   | 12.65604   | d3=       | 0.300 | nd2    | v2  | 19.39 | 1.496                 |
| R4   | 8.00240    | d4=       | 0.464 |        |     |       | 1.365                 |
| R5   | −242.79893 | d5=       | 0.300 | nd3    | v3  | 19.39 | 1.350                 |
| R6   | −94.08630  | d6=       | 0.030 |        |     |       | 1.512                 |
| R7   | −51.69197  | d7=       | 0.419 | nd4    | v4  | 55.82 | 1.680                 |
| R8   | −47.54548  | d8=       | 0.577 |        |     |       | 1.891                 |
| R9   | 35.94747   | d9=       | 0.420 | nd5    | v5  | 19.39 | 2.016                 |
| R10  | 31.47410   | d10=      | 0.421 |        |     |       | 2.516                 |
| R11  | 5.89813    | d11=      | 0.827 | nd6    | v6  | 55.82 | 3.575                 |
| R12  | 16.70332   | d12=      | 0.681 |        |     |       | 3.783                 |
| R13  | 26.95544   | d13=      | 0.672 | nd7    | v7  | 55.70 | 4.167                 |
| R14  | 2.84366    | d14=      | 0.550 |        |     |       | 4.685                 |
| R15  | ∞          | d15=      | 0.210 | ndg    | vg  | 64.20 | 5.681                 |
| R16  | ∞          | d16=      | 0.219 |        |     |       | 5.750                 |

Reference wavelength = 588 nm

Table 5 shows conic coefficients and aspheric surface coefficients of the lenses of the camera lens LA according to Embodiment 2 of the present disclosure.

TABLE 5

| | Conic coefficients | Aspheric surface coefficients | | | |
|---|---|---|---|---|---|
| | k | A4 | A6 | A8 | A10 |
| R1 | 6.0009E−02 | −1.3768E−02 | 4.8560E−02 | −9.7084E−02 | 1.1870E−01 |
| R2 | 0.0000E+00 | −6.8358E−03 | 2.7642E−02 | −6.4370E−02 | 9.3401E−02 |
| R3 | 0.0000E+00 | 5.3240E−03 | −2.0324E−02 | 5.5214E−02 | −7.3529E−02 |
| R4 | 0.0000E+00 | 8.5735E−03 | −2.3259E−02 | 8.8014E−02 | −1.6653E−01 |
| R5 | 0.0000E+00 | 5.2902E−03 | −1.2218E−01 | 2.7433E−01 | −4.2859E−01 |
| R6 | 0.0000E+00 | 1.0307E−01 | −3.2858E−01 | 4.8246E−01 | −4.5424E−01 |
| R7 | 0.0000E+00 | 1.2574E−01 | −3.4359E−01 | 4.7966E−01 | −4.1185E−01 |
| R8 | 0.0000E+00 | −1.2849E−03 | −2.3679E−02 | 2.5332E−02 | −1.8017E−02 |
| R9 | 0.0000E+00 | 9.5423E−03 | −3.2102E−02 | 2.4990E−02 | −1.6934E−02 |
| R10 | 0.0000E+00 | 1.7102E−02 | −4.1153E−02 | 3.1149E−02 | −1.5599E−02 |
| R11 | 0.0000E+00 | 1.6853E−02 | −3.0092E−02 | 1.2804E−02 | −3.3489E−03 |
| R12 | 0.0000E+00 | 3.7335E−02 | −2.6865E−02 | 7.9496E−03 | −1.5141E−03 |
| R13 | 0.0000E+00 | −3.4163E−02 | 3.5229E−03 | −7.1839E−04 | 1.7711E−04 |
| R14 | −1.0000E+00 | −5.5008E−02 | 1.2063E−02 | −2.4356E−03 | 3.5365E−04 |

| | Aspheric surface coefficients | | | | |
|---|---|---|---|---|---|
| | A12 | A14 | A16 | A18 | A20 |
| R1 | −9.1711E−02 | 4.5028E−02 | −1.3617E−02 | 2.3135E−03 | −1.6914E−04 |
| R2 | −8.4060E−02 | 4.7401E−02 | −1.6346E−02 | 3.1725E−03 | −2.6739E−04 |
| R3 | 6.0581E−02 | −3.0932E−02 | 9.4558E−03 | −1.5261E−03 | 9.3794E−05 |
| R4 | 1.9687E−01 | −1.4696E−01 | 6.7675E−02 | −1.7561E−02 | 1.9856E−03 |
| R5 | 4.4061E−01 | −2.9644E−01 | 1.2500E−01 | −2.9752E−02 | 3.0510E−03 |
| R6 | 2.7382E−01 | −1.0707E−01 | 2.7256E−02 | −4.2207E−03 | 3.0812E−04 |
| R7 | 2.1887E−01 | −7.1059E−02 | 1.3640E−02 | −1.4221E−03 | 6.3003E−05 |
| R8 | 1.0676E−02 | −5.0684E−03 | 1.6067E−03 | −2.8198E−04 | 2.0384E−05 |
| R9 | 8.6335E−03 | −3.3417E−03 | 8.9208E−04 | −1.4248E−04 | 9.9868E−06 |
| R10 | 5.0454E−03 | −1.0503E−03 | 1.3524E−04 | −9.7020E−06 | 2.9353E−07 |
| R11 | 5.5488E−04 | −5.7557E−05 | 3.6351E−06 | −1.2840E−07 | 1.9512E−09 |
| R12 | 1.8527E−04 | −1.4348E−05 | 6.9180E−07 | −1.9363E−08 | 2.4422E−10 |
| R13 | −2.3704E−05 | 1.8056E−06 | −8.0628E−08 | 1.9827E−09 | −2.0841E−11 |
| R14 | −3.3562E−05 | 2.0265E−06 | −7.5432E−08 | 1.5860E−09 | −1.4455E−11 |

Table 6 shows data of 2ω, Fno, f, f1, f2, f3, f4, f5, f6, f7, TTL, LB, and IH of the camera lens LA according to Embodiment 2 of the present disclosure.

TABLE 6

| 2ω (°) | 83.02 |
|---|---|
| Fno | 1.88 |
| f (mm) | 6.277 |
| f1 (mm) | 5.836 |
| f2 (mm) | −33.346 |
| f3 (mm) | 229.096 |
| f4 (mm) | 1051.329 |
| f5 (mm) | −392.287 |
| f6 (mm) | 16.309 |
| f7 (mm) | −6.005 |
| TTL (mm) | 7.202 |
| LB (mm) | 0.979 |
| IH (mm) | 5.644 |

As shown in Table 16, the camera lens according to Embodiment 2 satisfies the conditions (1) to (6).

Figure 4:
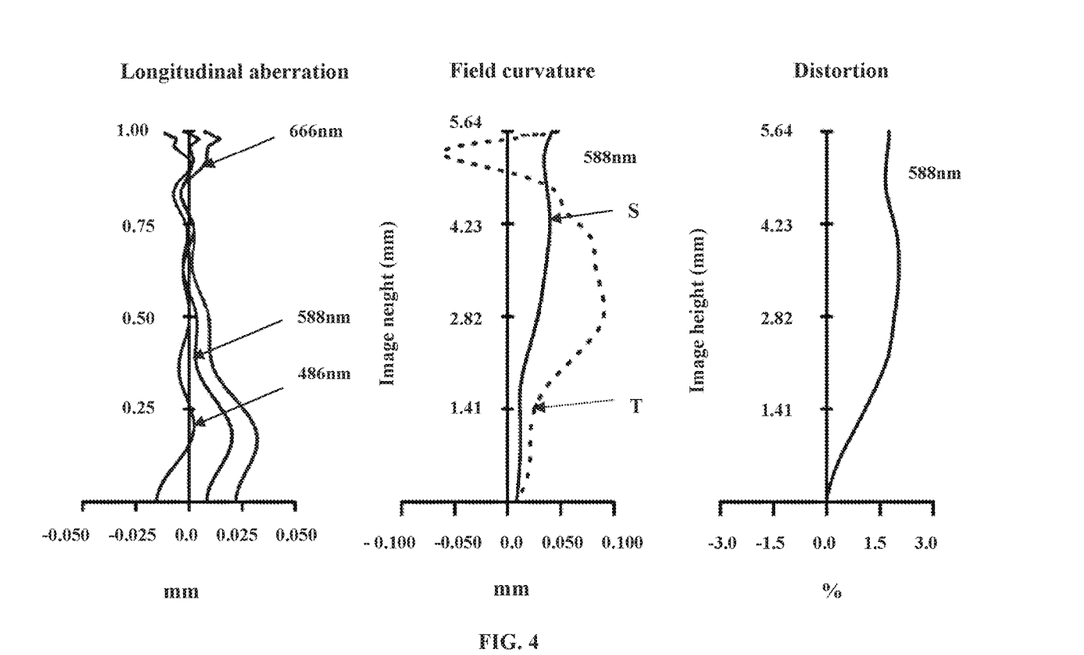
FIG. 4 is a schematic diagram of a longitudinal aberration, a field curvature, and a distortion of the camera lens according to Embodiment 2 of the present disclosure.

FIG. 4 shows a schematic diagram of a longitudinal aberration of with wavelengths of 486.0 nm, 588.0 nm, and 666.0 nm after passing the camera lens LA according to Embodiment 2, respectively. FIG. 2 also shows a schematic diagram of a field curvature and a distortion with a wavelength of 588.0 nm after passing the camera lens LA according to Embodiment 2.

The camera lens LA according to Embodiment 2 exhibits advantages of being wide-angle and ultra-thin with 2ω=83.02° and TTL/IH=1.276. As shown in FIG. 4, the chromatic aberrations on-axis and off-axis are fully corrected, thus the camera lens LA has excellent optical properties.

Embodiment 3

Figure 5:
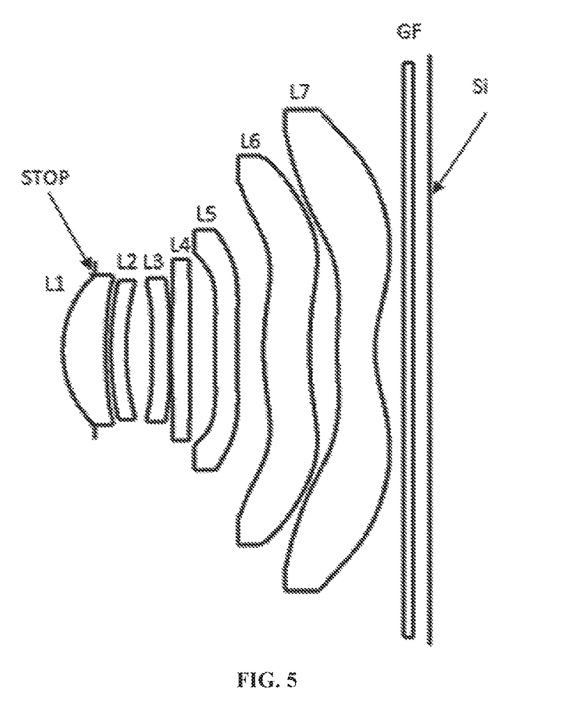
FIG. 5 is a schematic diagram of a structure of a camera lens according to Embodiment 3 of the present disclosure.

FIG. 5 shows a structural schematic diagram of a configuration of a camera lens LA according to Embodiment 3 of the present disclosure. Table 7 shows the design data of the first lens L1 to the seventh lens L7 of the camera lens LA according to Embodiment 3, including a curvature radius R, an on-axis thickness or on-axis distance d, a refractive index nd, an abbe number vd, and an effective radius. Here the refractive index nd, the abbe number vd, and the effective radius correspond to a wavelength of 588.0 nm.

TABLE 7

| | R | d | | nd | | vd | Effective radius (mm) |
|---|---|---|---|---|---|---|---|
| STOP | ∞ | d0= | −0.620 | | | | |
| R1 | 2.13363 | d1= | 0.837 | nd1 | 1.4565 | v1 90.27 | 1.498 |
| R2 | 8.23688 | d2= | 0.100 | | | | 1.395 |

TABLE 7-continued

|  | R | d |  | nd |  | vd | Effective radius (mm) |
|---|---|---|---|---|---|---|---|
| R3 | 5.48414 | d3= | 0.300 | nd2 | 1.6610 v2 | 20.53 | 1.372 |
| R4 | 4.66097 | d4= | 0.516 |  |  |  | 1.310 |
| R5 | −21.13352 | d5= | 0.338 | nd3 | 1.6610 v3 | 20.53 | 1.270 |
| R6 | −19.22667 | d6= | 0.030 |  |  |  | 1.419 |
| R7 | 140.73514 | d7= | 0.368 | nd4 | 1.5444 v4 | 55.82 | 1.602 |
| R8 | 163.02800 | d8= | 0.490 |  |  |  | 1.793 |
| R9 | 30.07922 | d9= | 0.432 | nd5 | 1.6700 v5 | 19.39 | 1.905 |
| R10 | 23.28174 | d10= | 0.530 |  |  |  | 2.380 |
| R11 | 6.43051 | d11= | 0.907 | nd6 | 1.5444 v6 | 55.82 | 3.342 |
| R12 | 13.81082 | d12= | 0.536 |  |  |  | 3.862 |
| R13 | 7.27145 | d13= | 0.737 | nd7 | 1.5346 v7 | 55.70 | 4.318 |
| R14 | 2.22544 | d14= | 0.550 |  |  |  | 4.771 |
| R15 | ∞ | d15= | 0.210 | ndg | 1.5168 vg | 64.20 | 5.620 |
| R16 | ∞ | d16= | 0.302 |  |  |  | 5.688 |

Reference wavelength = 588 nm

Table 8 shows conic coefficients and aspheric surface coefficients of the lenses of the camera lens LA according to Embodiment 3 of the present disclosure.

TABLE 8

| | conic coefficients | aspheric surface coefficients | | | |
|---|---|---|---|---|---|
| | k | A4 | A6 | A8 | A10 |
| R1 | 6.0883E−01 | −2.0529E−02 | 4.8328E−02 | −1.0009E−01 | 1.1970E−01 |
| R2 | 0.0000E+00 | −3.1864E−03 | −1.8789E−02 | 8.0474E−02 | −1.6678E−01 |
| R3 | 0.0000E+00 | −2.1563E−02 | 3.7293E−02 | −9.1788E−02 | 1.3884E−01 |
| R4 | 4.7568E−01 | −7.1072E−03 | 6.2480E−03 | −5.1380E−02 | 1.3175E−01 |
| R5 | 0.0000E+00 | 1.0172E−02 | −1.5432E−01 | 4.4754E−01 | −8.5684E−01 |
| R6 | 0.0000E+00 | 1.0300E−01 | −2.8865E−01 | 3.3130E−01 | −1.5125E−01 |
| R7 | 0.0000E+00 | 1.6386E−01 | −4.3358E−01 | 6.2918E−01 | −5.7984E−01 |
| R8 | 0.0000E+00 | 1.6714E−02 | −2.9199E−02 | 3.9158E−03 | 2.5094E−02 |
| R9 | 0.0000E+00 | 1.6866E−02 | −5.9365E−02 | 5.3526E−02 | −3.2821E−02 |
| R10 | 0.0000E+00 | 2.2800E−02 | −6.0379E−02 | 5.1157E−02 | −2.8309E−02 |
| R11 | 0.0000E+00 | 2.6822E−02 | −3.7632E−02 | 1.6179E−02 | −4.3937E−03 |
| R12 | 0.0000E+00 | 4.6096E−02 | −2.9945E−02 | 8.7220E−03 | −1.6329E−03 |
| R13 | 0.0000E+00 | −5.3260E−02 | 1.5295E−02 | −4.2578E−03 | 7.9409E−04 |
| R14 | −6.7113E+00 | −3.0340E−02 | 7.7778E−03 | −1.7254E−03 | 2.5765E−04 |

| | aspheric surface coefficients | | | | |
|---|---|---|---|---|---|
| | A12 | A14 | A16 | A18 | A20 |
| R1 | −9.1498E−02 | 4.4939E−02 | −1.3754E−02 | 2.3624E−03 | −1.6942E−04 |
| R2 | 2.1389E−01 | −1.6941E−01 | 8.0681E−02 | −2.1138E−02 | 2.3570E−03 |
| R3 | −1.2097E−01 | 6.0284E−02 | −1.5869E−02 | 1.7792E−03 | −2.8310E−05 |
| R4 | −1.7846E−01 | 1.4478E−01 | −7.1911E−02 | 2.0673E−02 | −2.6616E−03 |
| R5 | 1.0645E+00 | −8.5383E−01 | 4.2565E−01 | −1.1930E−01 | 1.4330E−02 |
| R6 | −7.5437E−02 | 1.3862E−01 | −7.6406E−02 | 1.9816E−02 | −2.0421E−03 |
| R7 | 3.4862E−01 | −1.3652E−01 | 3.3815E−02 | −4.8605E−03 | 3.1243E−04 |
| R8 | −2.8104E−02 | 1.4729E−02 | −4.2436E−03 | 6.4645E−04 | −4.0796E−05 |
| R9 | 1.1653E−02 | −1.9260E−03 | −6.8662E−05 | 7.0058E−05 | −6.8523E−06 |
| R10 | 1.0247E−02 | −2.4034E−03 | 3.5149E−04 | −2.9003E−05 | 1.0265E−06 |
| R11 | 7.7711E−04 | −8.7908E−05 | 6.1336E−06 | −2.4091E−07 | 4.0793E−09 |
| R12 | 1.9746E−04 | −1.4809E−05 | 6.4406E−07 | −1.4105E−08 | 1.0467E−10 |
| R13 | −8.9545E−05 | 6.1307E−06 | −2.5099E−07 | 5.6752E−09 | −5.4727E−11 |
| R14 | −2.4389E−05 | 1.4486E−06 | −5.2589E−08 | 1.0711E−09 | −9.4036E−12 |

Table 9 shows data of au, Fno, f, f1, f2, f3, f4, f5, f6, f7, TTL, LB, and IH of the camera lens LA according to Embodiment 3 of the present disclosure.

TABLE 9

| 2ω (°) | 83.01 |
|---|---|
| Fno | 2.10 |
| f (mm) | 6.287 |
| f1 (mm) | 6.048 |
| f2 (mm) | −54.950 |
| f3 (mm) | 301.125 |

TABLE 9-continued

| f4 (mm) | 1879.671 |
|---|---|
| f5 (mm) | −157.792 |
| f6 (mm) | 21.187 |
| f7 (mm) | −6.321 |
| TTL (mm) | 7.184 |
| LB (mm) | 1.062 |
| IH (mm) | 5.644 |

As shown in Table 16, the camera lens according to Embodiment 3 satisfies the conditions (1) to (6).

Figure 6:
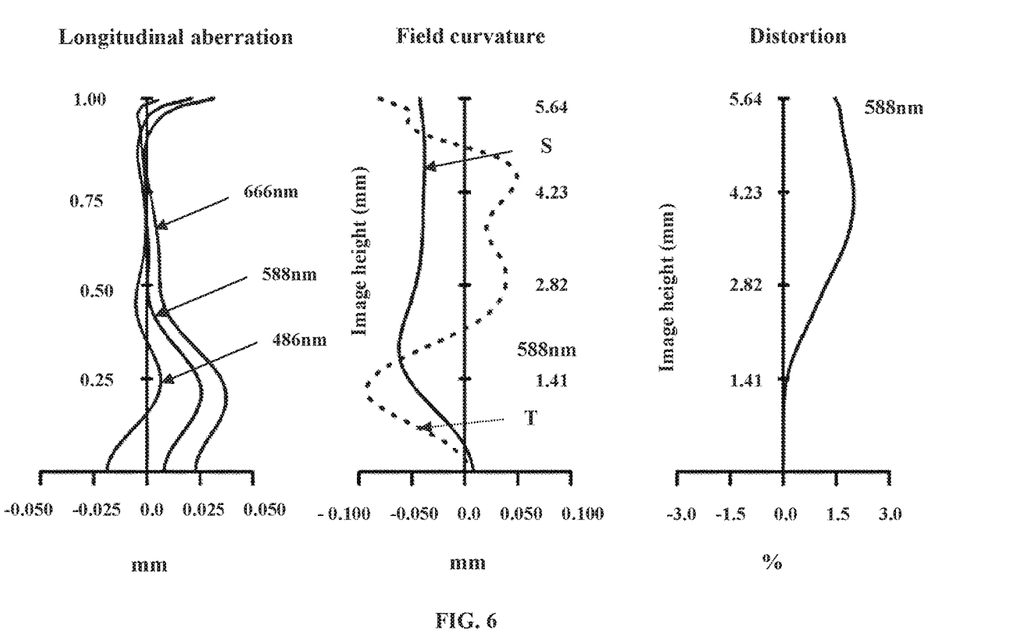
FIG. 6 is a schematic diagram of a longitudinal aberration, a field curvature, and a distortion of the camera lens according to Embodiment 3 of the present disclosure.

FIG. 6 shows a schematic diagram of a longitudinal aberration of with wavelengths of 486.0 nm, 588.0 nm, and 666.0 nm after passing the camera lens LA according to Embodiment 3, respectively. FIG. 6 also shows a schematic diagram of a field curvature and a distortion with a wavelength of 588.0 nm after passing the camera lens LA according to Embodiment 3.

The camera lens LA according to Embodiment 3 exhibits advantages of being wide-angle and ultra-thin with 2ω=83.02° and TTL/IH=1.276. As shown in FIG. 6, the chromatic aberrations on-axis and off-axis are fully corrected, thus the camera lens LA has excellent optical properties.

Embodiment 4

Figure 7:
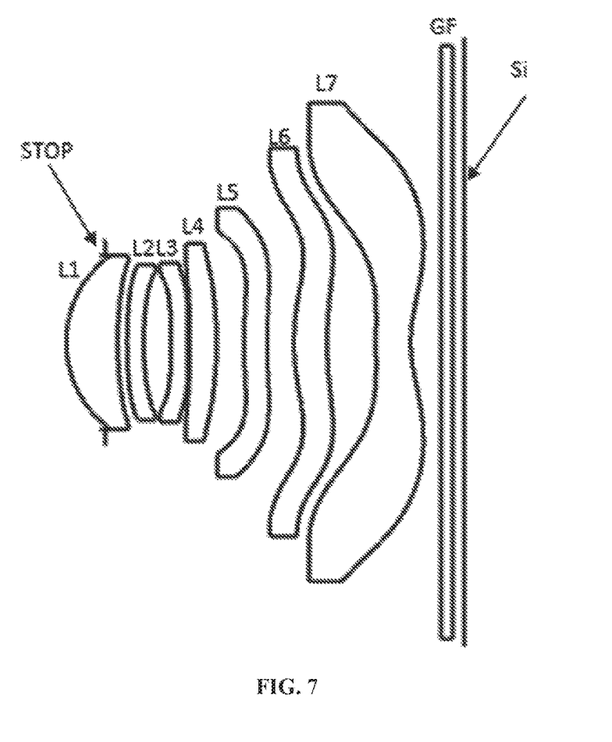
FIG. 7 is a schematic diagram of a structure of a camera lens according to Embodiment 4 of the present disclosure.

FIG. 7 shows a structural schematic diagram of a configuration of a camera lens LA according to Embodiment 4 of the present disclosure. Table 10 shows the design data of the first lens L1 to the seventh lens L7 of the camera lens LA according to Embodiment 4, including a curvature radius R, an on-axis thickness or on-axis distance d, a refractive index nd, an abbe number νd, and an effective radius. Here the refractive index nd, the abbe number νd, and the effective radius correspond to a wavelength of 588.0 nm.

TABLE 10

|  | R | d |  | nd | νd | Effective radius (mm) |
|---|---|---|---|---|---|---|
| STOP | ∞ | d0= | −0.702 |  |  |  |
| R1 | 2.18405 | d1= | 0.928 | nd1 1.4959 | ν1 81.66 | 1.670 |
| R2 | 7.42901 | d2= | 0.171 |  |  | 1.555 |
| R3 | 9.35382 | d3= | 0.300 | nd2 1.6700 | ν2 19.39 | 1.495 |
| R4 | 6.52729 | d4= | 0.493 |  |  | 1.365 |
| R5 | −21.70135 | d5= | 0.308 | nd3 1.6700 | ν3 19.39 | 1.350 |
| R6 | −18.61498 | d6= | 0.030 |  |  | 1.525 |
| R7 | −8.20289 | d7= | 0.485 | nd4 1.5444 | ν4 55.82 | 1.680 |
| R8 | −7.94887 | d8= | 0.499 |  |  | 1.901 |
| R9 | 13.91745 | d9= | 0.420 | nd5 1.6700 | ν5 19.39 | 2.149 |
| R10 | 13.24671 | d10= | 0.493 |  |  | 2.579 |
| R11 | 4.97807 | d11= | 0.600 | nd6 1.5444 | ν6 55.82 | 3.353 |
| R12 | 11.63163 | d12= | 0.879 |  |  | 3.726 |
| R13 | 27.47088 | d13= | 0.631 | nd7 1.5346 | ν7 55.70 | 4.166 |
| R14 | 2.73240 | d14= | 0.550 |  |  | 4.591 |
| R15 | ∞ | d15= | 0.210 | ndg 1.5168 | νg 64.20 | 5.618 |
| R16 | ∞ | d16= | 0.204 |  |  | 5.690 |

Reference wavelength = 588 nm

Table 11 shows conic coefficients and aspheric surface coefficients of the lenses of the camera lens LA according to Embodiment 4 of the present disclosure.

TABLE 11

|  | conic coefficients | aspheric surface coefficients | | | |
|---|---|---|---|---|---|
|  | k | A4 | A6 | A8 | A10 |
| R1 | 1.5355E−01 | −1.5389E−02 | 4.9256E−02 | −9.7727E−02 | 1.1882E−01 |
| R2 | 0.0000E+00 | −7.1655E−03 | 2.8048E−02 | −6.4058E−02 | 9.3445E−02 |
| R3 | 0.0000E+00 | 5.1527E−03 | −1.7354E−02 | 5.4198E−02 | −7.3431E−02 |
| R4 | 0.0000E+00 | 4.9132E−03 | 7.2188E−03 | −4.9585E−03 | 2.0866E−03 |
| R5 | 0.0000E+00 | −6.2416E−03 | −1.7664E−01 | 4.4739E−01 | −7.1964E−01 |
| R6 | 0.0000E+00 | 1.7363E−01 | −6.1815E−01 | 1.0181E+00 | −1.0540E+00 |
| R7 | 0.0000E+00 | 2.5552E−01 | −7.0932E−01 | 1.1101E+00 | −1.0923E+00 |
| R8 | 0.0000E+00 | 2.4448E−02 | −5.5940E−02 | 6.0680E−02 | −4.2610E−02 |
| R9 | 0.0000E+00 | 1.5655E−02 | −4.4068E−02 | 3.0212E−02 | −1.1611E−02 |
| R10 | 0.0000E+00 | 1.6380E−02 | −4.7233E−02 | 3.7255E−02 | −1.8573E−02 |
| R11 | 0.0000E+00 | 1.8526E−02 | −3.2934E−02 | 1.4081E−02 | −3.6918E−03 |
| R12 | 0.0000E+00 | 3.6016E−02 | −2.9637E−02 | 9.7767E−03 | −2.0522E−03 |
| R13 | 0.0000E+00 | −4.6974E−02 | 7.5684E−03 | −1.1085E−03 | 1.5849E−04 |
| R14 | −1.0000E+00 | −6.1068E−02 | 1.3898E−02 | −2.6242E−03 | 3.5017E−04 |

|  | aspheric surface coefficients | | | | |
|---|---|---|---|---|---|
|  | A12 | A14 | A16 | A18 | A20 |
| R1 | −9.1655E−02 | 4.5007E−02 | −1.3618E−02 | 2.3137E−03 | −1.6874E−04 |
| R2 | −8.4086E−02 | 4.7363E−02 | −1.6333E−02 | 3.1772E−03 | −2.6903E−04 |
| R3 | 6.0384E−02 | −3.0769E−02 | 9.4249E−03 | −1.5317E−03 | 9.5203E−05 |
| R4 | 1.2821E−02 | −2.6068E−02 | 2.1470E−02 | −8.3519E−03 | 1.2864E−03 |
| R5 | 7.4935E−01 | −5.0896E−01 | 2.1742E−01 | −5.2823E−02 | 5.5659E−03 |
| R6 | 7.0411E−01 | −3.0467E−01 | 8.3383E−02 | −1.3212E−02 | 9.2923E−04 |
| R7 | 6.9267E−01 | −2.8258E−01 | 7.1897E−02 | −1.0415E−02 | 6.5715E−04 |
| R8 | 2.1155E−02 | −7.6479E−03 | 1.9039E−03 | −2.7948E−04 | 1.7572E−05 |
| R9 | 9.7794E−04 | 9.9039E−04 | −4.2568E−04 | 7.0632E−05 | −4.3692E−06 |
| R10 | 5.9404E−03 | −1.2219E−03 | 1.5615E−04 | −1.1232E−05 | 3.4552E−07 |

TABLE 11-continued

| R11 | 6.0599E−04 | −6.1485E−05 | 3.7592E−06 | −1.2785E−07 | 1.8731E−09 |
| --- | --- | --- | --- | --- | --- |
| R12 | 2.7593E−04 | −2.3222E−05 | 1.1835E−06 | −3.3551E−08 | 4.0821E−10 |
| R13 | −1.5283E−05 | 8.9247E−07 | −3.0649E−08 | 5.7585E−10 | −4.6578E−12 |
| R14 | −3.1329E−05 | 1.8266E−06 | −6.6756E−08 | 1.3964E−09 | −1.2821E−11 |

Table 12 shows data of 2ω, Fno, f, f1, f2, f3, f4, f5, f6, f7, TTL, LB, and IH of the camera lens LA according to Embodiment 4 of the present disclosure.

TABLE 12

| 2ω (°) | 83.02 |
| --- | --- |
| Fno | 1.87 |
| f (mm) | 6.262 |
| f1 (mm) | 5.892 |
| f2 (mm) | −33.675 |
| f3 (mm) | 187.848 |
| f4 (mm) | 281.772 |
| f5 (mm) | −547.891 |
| f6 (mm) | 15.494 |
| f7 (mm) | −5.727 |
| TTL (mm) | 7.202 |
| LB (mm) | 0.964 |
| IH (mm) | 5.644 |

As shown in Table 16, the camera lens according to Embodiment 4 satisfies the conditions (1) to (6).

Figure 8:
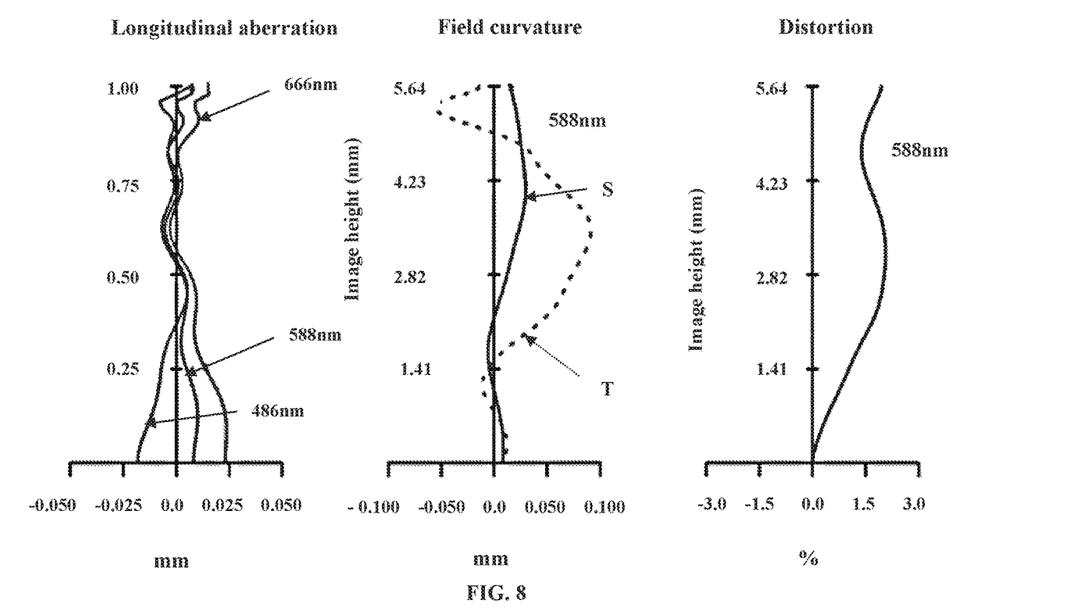
FIG. 8 is a schematic diagram of a longitudinal aberration, a field curvature, and a distortion of the camera lens according to Embodiment 4 of the present disclosure.

FIG. 8 shows a schematic diagram of a longitudinal aberration of with wavelengths of 486.0 nm, 588.0 nm, and 666.0 nm after passing the camera lens LA according to Embodiment 4, respectively. FIG. 8 also shows a schematic diagram of a field curvature and a distortion with a wavelength of 588.0 nm after passing the camera lens LA according to Embodiment 4.

The camera lens LA according to Embodiment 4 exhibits advantages of being wide-angle and ultra-thin with 2ω=83.02° and TTL/IH=1.276. As shown in FIG. 8, the chromatic aberrations on-axis and off-axis are fully corrected, thus the camera lens LA has excellent optical properties.

Embodiment 5

Figure 9:
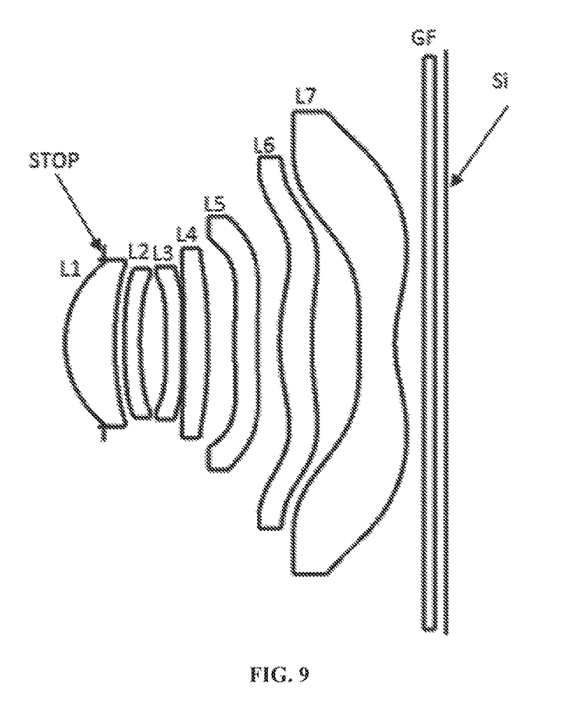
FIG. 9 is a schematic diagram of a structure of a camera lens according to Embodiment 5 of the present disclosure.

FIG. 9 shows a structural schematic diagram of a configuration of a camera lens LA according to Embodiment 5 of the present disclosure. Table 13 shows the design data of the first lens L1 to the seventh lens L7 of the camera lens LA according to Embodiment 5, including a curvature radius R, an on-axis thickness or on-axis distance d, a refractive index nd, an abbe number vd, and an effective radius. Here the refractive index nd, the abbe number vd, and the effective radius correspond to a wavelength of 588.0 nm.

TABLE 13

| | R | d | | nd | | vd | Effective radius (mm) |
| --- | --- | --- | --- | --- | --- | --- | --- |
| STOP | ∞ | d0= | −0.725 | | | | |
| R1 | 2.17466 | d1= | 0.939 | nd1 | 1.4959 | v1 | 81.66 | 1.670 |
| R2 | 7.44012 | d2= | 0.182 | | | | | 1.548 |
| R3 | 11.14066 | d3= | 0.300 | nd2 | 1.6700 | v2 | 19.39 | 1.492 |
| R4 | 7.36007 | d4= | 0.482 | | | | | 1.365 |
| R5 | −35.78994 | d5= | 0.312 | nd3 | 1.6700 | v3 | 19.39 | 1.350 |
| R6 | −30.09291 | d6= | 0.030 | | | | | 1.526 |
| R7 | −11.36204 | d7= | 0.458 | nd4 | 1.5444 | v4 | 55.82 | 1.680 |
| R8 | −11.38322 | d8= | 0.501 | | | | | 1.894 |
| R9 | 22.04782 | d9= | 0.432 | nd5 | 1.6700 | v5 | 19.39 | 2.094 |
| R10 | 18.42378 | d10= | 0.429 | | | | | 2.538 |
| R11 | 4.71601 | d11= | 0.609 | nd6 | 1.5444 | v6 | 55.82 | 3.364 |
| R12 | 11.77446 | d12= | 0.894 | | | | | 3.718 |
| R13 | 38.21325 | d13= | 0.676 | nd7 | 1.5346 | v6 | 55.70 | 4.187 |
| R14 | 2.79924 | d14= | 0.550 | | | | | 4.618 |
| R15 | ∞ | d15= | 0.210 | ndg | 1.5168 | v7 | 64.20 | 5.661 |
| R16 | ∞ | d16= | 0.199 | | | | | 5.734 |

Reference wavelength = 588 nm

Table 14 shows conic coefficients and aspheric surface coefficients of the lenses of the camera lens LA according to Embodiment 5 of the present disclosure.

TABLE 14

| | conic coefficients | aspheric surface coefficients | | | |
| --- | --- | --- | --- | --- | --- |
| | k | A4 | A6 | A8 | A10 |
| R1 | 1.5104E−01 | −1.5339E−02 | 4.9136E−02 | −9.7687E−02 | 1.1883E−01 |
| R2 | 0.0000E+00 | −6.0682E−03 | 2.7875E−02 | −6.4121E−02 | 9.3516E−02 |
| R3 | 0.0000E+00 | 5.3969E−03 | −1.5329E−02 | 5.1571E−02 | −7.2223E−02 |
| R4 | 0.0000E+00 | 8.5947E−03 | −1.8726E−02 | 8.1848E−02 | −1.6261E−01 |
| R5 | 0.0000E+00 | −4.1045E−03 | −1.6803E−01 | 4.1150E−01 | −6.4963E−01 |
| R6 | 0.0000E+00 | 1.4137E−01 | −4.7353E−01 | 7.0239E−01 | −6.5303E−01 |
| R7 | 0.0000E+00 | 2.1389E−01 | −5.4742E−01 | 7.7488E−01 | −6.8546E−01 |
| R8 | 0.0000E+00 | 1.9336E−02 | −4.0005E−02 | 3.4178E−02 | −1.7338E−02 |

TABLE 14-continued

| | | | | | |
|---|---|---|---|---|---|
| R9 | 0.0000E+00 | 1.1969E−02 | −2.9746E−02 | 1.1040E−02 | 3.5795E−03 |
| R10 | 0.0000E+00 | 1.4143E−02 | −4.0976E−02 | 3.1254E−02 | −1.5430E−02 |
| R11 | 0.0000E+00 | 1.6503E−02 | −3.1556E−02 | 1.3874E−02 | −3.7921E−03 |
| R12 | 0.0000E+00 | 3.3413E−02 | −2.7563E−02 | 9.0149E−03 | −1.8961E−03 |
| R13 | 0.0000E+00 | −4.6957E−02 | 6.9588E−03 | −1.0329E−03 | 1.7795E−04 |
| R14 | −1.0000E+00 | −5.9021E−02 | 1.3210E−02 | −2.5160E−03 | 3.4072E−04 |

| aspheric surface coefficients | | | | | |
|---|---|---|---|---|---|
| | A12 | A14 | A16 | A18 | A20 |
| R1 | −9.1667E−02 | 4.5004E−02 | −1.3616E−02 | 2.3140E−03 | −1.6894E−04 |
| R2 | −8.4099E−02 | 4.7362E−02 | −1.6331E−02 | 3.1771E−03 | −2.6928E−04 |
| R3 | 6.0634E−02 | −3.1143E−02 | 9.5236E−03 | −1.5354E−03 | 9.4339E−05 |
| R4 | 2.0155E−01 | −1.5905E−01 | 7.7853E−02 | −2.1528E−02 | 2.5876E−03 |
| R5 | 6.6696E−01 | −4.4710E−01 | 1.8851E−01 | −4.5198E−02 | 4.7014E−03 |
| R6 | 3.9212E−01 | −1.5334E−01 | 3.8578E−02 | −5.7916E−03 | 4.0317E−04 |
| R7 | 3.9108E−01 | −1.4397E−01 | 3.3231E−02 | −4.4053E−03 | 2.5748E−04 |
| R8 | 6.5516E−03 | −2.4164E−03 | 7.6852E−04 | −1.4394E−04 | 1.0855E−05 |
| R9 | −7.0186E−03 | 3.7870E−03 | −1.0471E−03 | 1.4940E−04 | −8.6622E−06 |
| R10 | 4.9327E−03 | −1.0200E−03 | 1.3174E−04 | −9.6162E−06 | 3.0105E−07 |
| R11 | 6.5766E−04 | −7.1724E−05 | 4.8022E−06 | −1.8173E−07 | 2.9910E−09 |
| R12 | 2.5707E−04 | −2.1912E−05 | 1.1378E−06 | −3.3125E−08 | 4.1767E−10 |
| R13 | −2.0633E−05 | 1.4309E−06 | −5.8569E−08 | 1.3225E−09 | −1.2829E−11 |
| R14 | −3.0811E−05 | 1.8076E−06 | −6.6210E−08 | 1.3819E−09 | −1.2587E−11 |

Table 15 shows data of 2ω, Fno, f, f1, f2, f3, f4, f5, f6, f7, TTL, LB, and IH of the camera lens LA according to Embodiment 5 of the present disclosure.

TABLE 15

| | |
|---|---|
| 2ω (°) | 83.02 |
| Fno | 1.88 |

TABLE 15-continued

| | |
|---|---|
| f (mm) | 6.275 |
| f1 (mm) | 5.850 |
| f2 (mm) | −33.437 |
| f3 (mm) | 276.116 |
| f4 (mm) | 1694.350 |
| f5 (mm) | −175.710 |
| f6 (mm) | 14.025 |
| f7 (mm) | −5.688 |
| TTL (mm) | 7.202 |
| LB (mm) | 0.959 |
| IH (mm) | 5.644 |

As shown in Table 16, the camera lens according to Embodiment 5 satisfies the conditions (1) to (6).

Figure 10:
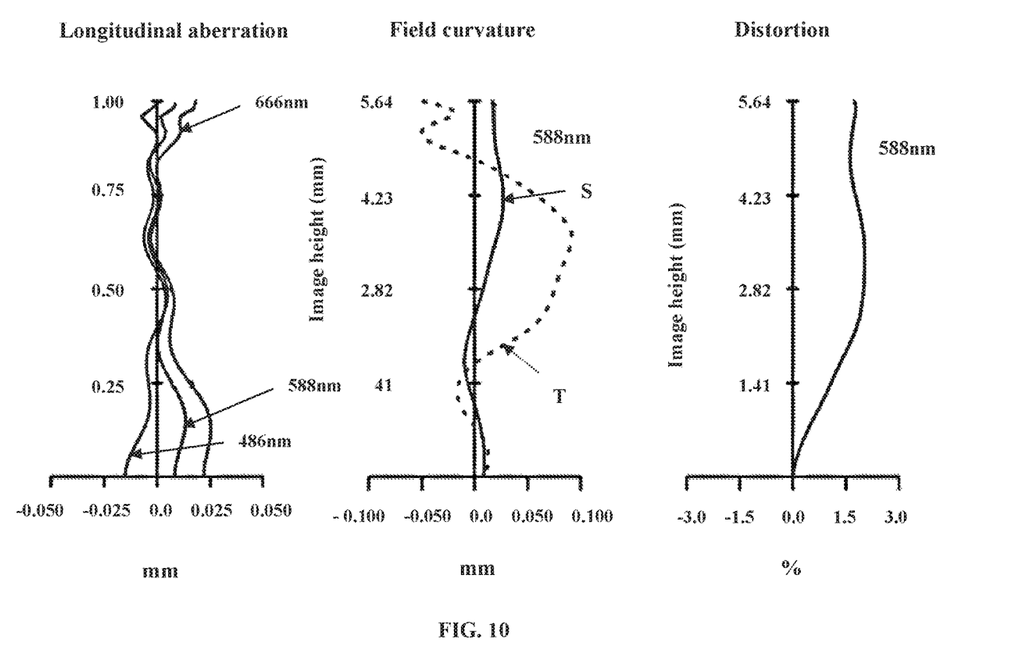
FIG. 10 is a schematic diagram of a longitudinal aberration, a field curvature and a distortion of the camera lens according to Embodiment 5 of the present disclosure.

FIG. 10 shows a schematic diagram of a longitudinal aberration of with wavelengths of 486.0 nm, 588.0 nm, and 666.0 nm after passing the camera lens LA according to Embodiment 5, respectively. FIG. 10 also shows a schematic diagram of a field curvature and a distortion with a wavelength of 588.0 nm after passing the camera lens LA according to Embodiment 5.

The camera lens LA according to Embodiment 5 exhibits advantages of being wide-angle and ultra-thin with 2ω=83.02° and TTL/IH=1.276. As shown in FIG. 10, the chromatic aberrations on-axis and off-axis are fully corrected, thus the camera lens LA has excellent optical properties.

Table 16 shows various values of Embodiments 1 to 5 and the values corresponding to parameters which are specified in the conditions (1) to (6).

TABLE 16

| | Embodiment 1 | Embodiment 2 | Embodiment 3 | Embodiment 4 | Embodiment 5 | Condition |
|---|---|---|---|---|---|---|
| v1-v2 | 50.055 | 62.262 | 69.740 | 62.262 | 62.262 | (1) |
| v1-v3 | 50.055 | 62.262 | 69.740 | 62.262 | 62.262 | (2) |
| f1/f2 | −0.248 | −0.175 | −0.110 | −0.175 | −0.175 | (3) |
| f5/f | −99.900 | −62.500 | −25.100 | −87.500 | −28.000 | (4) |
| f3/f | 25.100 | 36.500 | 47.900 | 30.000 | 44.000 | (5) |
| f4/f | 35.100 | 167.500 | 299.000 | 45.000 | 270.000 | (6) |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera lens comprising, from an object side to an image side:
   a first lens having a positive refractive power;
   a second lens having a negative refractive power;
   a third lens having a positive refractive power;
   a fourth lens having a positive refractive power;
   a fifth lens having a negative refractive power;
   a sixth lens having a positive refractive power; and
   a seventh lens having a negative refractive power;
   wherein the camera lens satisfies following conditions (1) to (4):

$$50.00 \leq v1-v2 \leq 70.00 \quad (1);$$

$$50.00 \leq v1-v3 \leq 70.00 \quad (2);$$

$$-0.25 \leq f1/f2 \leq -0.10 \quad (3); \text{ and}$$

$$-100.00 \leq f5/f \leq -25.00 \quad (4);$$

where f denotes a focal length of the camera lens;
f1 denotes a focal length of the first lens;
f2 denotes a focal length of the second lens;
f5 denotes a focal length of the fifth lens;
v1 denotes an abbe number of the first lens;
v2 denotes an abbe number of the second lens;
v3 denotes an abbe number of the third lens.

2. The camera optical lens according to claim 1 further satisfying following condition (5):

$$25.00 \leq f3/f \leq 48.00 \tag{5};$$

where
f3 denotes a focal length of the third lens.

3. The camera optical lens according to claim 1 further satisfying following condition (6):

$$35.00 \leq f4/f \leq 300.00 \tag{6};$$

where
f4 denotes a focal length of the fourth lens.

\* \* \* \* \*